(12) United States Patent
Ade-Hall

(10) Patent No.: US 9,141,279 B2
(45) Date of Patent: Sep. 22, 2015

(54) SYSTEMS AND METHODS FOR PROVIDING A USER INTERFACE

(71) Applicant: Martin Ade-Hall, Wigan (GB)

(72) Inventor: Martin Ade-Hall, Wigan (GB)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/924,904

(22) Filed: Jun. 24, 2013

(65) Prior Publication Data

US 2013/0285962 A1 Oct. 31, 2013

Related U.S. Application Data

(63) Continuation of application No. 11/839,636, filed on Aug. 16, 2007, now Pat. No. 8,471,823.

(51) Int. Cl.
*G06F 3/0488* (2013.01)
*G06F 3/023* (2006.01)
*G06F 3/0481* (2013.01)
*G06F 3/0482* (2013.01)
*H04M 1/725* (2006.01)

(52) U.S. Cl.
CPC ............ *G06F 3/0488* (2013.01); *G06F 3/0236* (2013.01); *G06F 3/0481* (2013.01); *G06F 3/0482* (2013.01); *G06F 3/04886* (2013.01); *G06F 2203/04805* (2013.01); *H04M 1/72522* (2013.01); *H04M 2250/22* (2013.01); *H04M 2250/70* (2013.01)

(58) Field of Classification Search
CPC ........................................................ G06F 3/04
USPC ................................................. 345/173–179
See application file for complete search history.

(56) References Cited

U.S. PATENT DOCUMENTS

| | | | | |
|---|---|---|---|---|
| 5,196,838 A | * | 3/1993 | Meier et al. | 345/684 |
| 6,073,036 A | * | 6/2000 | Heikkinen et al. | 455/550.1 |
| 6,169,538 B1 | * | 1/2001 | Nowlan et al. | 345/168 |
| 6,204,848 B1 | * | 3/2001 | Nowlan et al. | 715/810 |
| 2005/0177783 A1 | * | 8/2005 | Agrawala et al. | 715/512 |

* cited by examiner

*Primary Examiner* — Alexander Eisen
*Assistant Examiner* — Cory Almeida
(74) *Attorney, Agent, or Firm* — Snyder, Clark, Lesch & Chung, LLP

(57) ABSTRACT

A device may include a touch sensitive display and logic configured to control the touch sensitive display to display information to a user, provide a window of enlarged information via the touch sensitive display based on a determined position of input on the touch sensitive display, and receive a selection from the enlarged information based on a determined position of input within the provided window.

20 Claims, 12 Drawing Sheets

SYSTEMS AND METHODS FOR PROVIDING A USER INTERFACE

CROSS-REFERENCE TO RELATED APPLICATION

This application is a continuation of U.S. patent application Ser. No. 11/839,636 filed Aug. 16, 2007, the disclosure of which is hereby incorporated herein in its entirety, by reference.

TECHNICAL FIELD OF THE INVENTION

Implementations described herein relate generally to input devices, and more particularly, to input devices that can be used in handheld devices.

DESCRIPTION OF RELATED ART

Devices, such as mobile communication devices usually include a display and keys to enter information into the device. Generally, both the display and keys contained in mobile devices are small. The restricted size of the display and keys inhibit the speed at which an operator may interact with the mobile device, as entering information via the keys and/or interacting with the display must be done in a very slow and precise manner.

SUMMARY

According to one aspect, a mobile communication device is provided. The mobile communication device may comprise a touch sensitive display and logic configured to control the touch sensitive display to display information to a user; provide a window of enlarged information via the touch sensitive display based on a determined position of input on the touch sensitive display; and receive a selection via the window of enlarged information based on a determined position of input within the provided window.

Additionally, the displayed information includes an interface screen with a plurality of selections.

Additionally, the enlarged information includes at least one of the plurality of selections.

Additionally, the determined position of input within the provided window is determined by the position of a finger of a user or a stylus on the touch sensitive display.

Additionally, the determined position of input within the provided window is determined by the position where the user lifts a finger or the stylus off the touch sensitive display.

According to another aspect, a method may be provided. The method may comprise displaying a plurality of groups of characters via a touch sensitive display; determining a position of input on the touch sensitive display; displaying an enlarged window of one of the groups of characters based on the determined position of input; and selecting one of the characters from the group of characters within the enlarged window based on at least one of a determined position of input within the enlarged window or a determined position of input outside the enlarged window.

Additionally, each of the groups of characters includes a plurality of letters.

Additionally, the displaying a plurality of groups of characters comprises displaying a "QWERTY" type of keyboard by displaying the plurality of letters in the groups of characters.

Additionally, the displayed enlarged window of one of the groups of characters includes a central letter surrounded by the other letters in the selected group.

Additionally, the selecting one of the characters from the group of characters within the enlarged window based on a determined position of input is determined by determining a position where a user lifted a finger off the surface of the touch sensitive display.

According to another aspect, a method may be provided. The method may comprise displaying an interface screen via a touch sensitive display; determining a position of input on the touch sensitive display; displaying a cursor on the interface screen based on the determined position of input on the touch sensitive display; and selecting a choice displayed on the interface screen based on a position of the cursor.

Additionally, the displayed cursor on the interface screen is displayed on the touch sensitive display at a position at or offset from the determined position of input.

Additionally, the determined position of input is determined by a sensing a position of a user's finger or a stylus on the touch sensitive display.

Additionally, the selected choice displayed on the interface screen based on a position of the cursor is selected when a user lifts a finger off the surface of the touch sensitive display.

Additionally, the offset position of the displayed cursor may be changed based on a user defined preference.

According to yet another aspect, a mobile communication device is provided. The mobile communication device may comprise a plurality of keys; a display; and logic configured to: control the display to display groups of characters, wherein a position of the displayed groups of characters correspond to physical locations of the plurality of keys; select one of the displayed groups of characters based on a first key input; and select one character from the selected displayed group of characters based on a second key input.

Additionally, the logic may be further configured to control the display to display the selected group of characters in an enlarged manner.

Additionally, a displayed position of enlarged characters within a group correspond to physical locations of the plurality of keys.

Additionally, the displayed groups of characters form a "QWERTY" type of keyboard.

Additionally, the at least some of the displayed groups of characters include nine letters.

BRIEF DESCRIPTION OF THE DRAWINGS

The accompanying drawings, which are incorporated in and constitute a part of this specification, illustrate a number of embodiments and, together with the description, explain the embodiments. In the drawings.

DETAILED DESCRIPTION OF THE INVENTION

The following detailed description of the invention refers to the accompanying drawings. The same reference numbers in different drawings may identify the same or similar elements. Also, the following detailed description does not limit the embodiments.

Implementations of the invention can be used to improve a user interface, such as a display and keypad, on a device (e.g., a communications device). Implementations described herein may change the appearance and/or configuration of the user interface using logic, such as machine-readable instructions executed by a processing device. In some instances, the changing of the appearance and/or configuration of the user interface may be application controlled. That is, when a particular application is launched or being executed or a function associated with a particular application is being executed, the user interface may change based on the particular application. Implementations of the user interface may receive user inputs via touch, e.g., via a user's finger, via input devices, e.g., a stylus, via speech, and/or via other techniques and/or devices.

Exemplary implementations will be described in the context of a mobile terminal. It should be understood that a mobile terminal is an example of a device that can employ a user interface consistent with the principles of the embodiments and should not be construed as limiting the types or sizes of devices or applications that can employ the user interface described herein. For example, user interfaces described herein may be used on desktop communication devices, household appliances, such as microwave ovens and/or appliance remote controls, automobile radio faceplates, industrial devices, such as testing equipment, etc.

Figure 1:
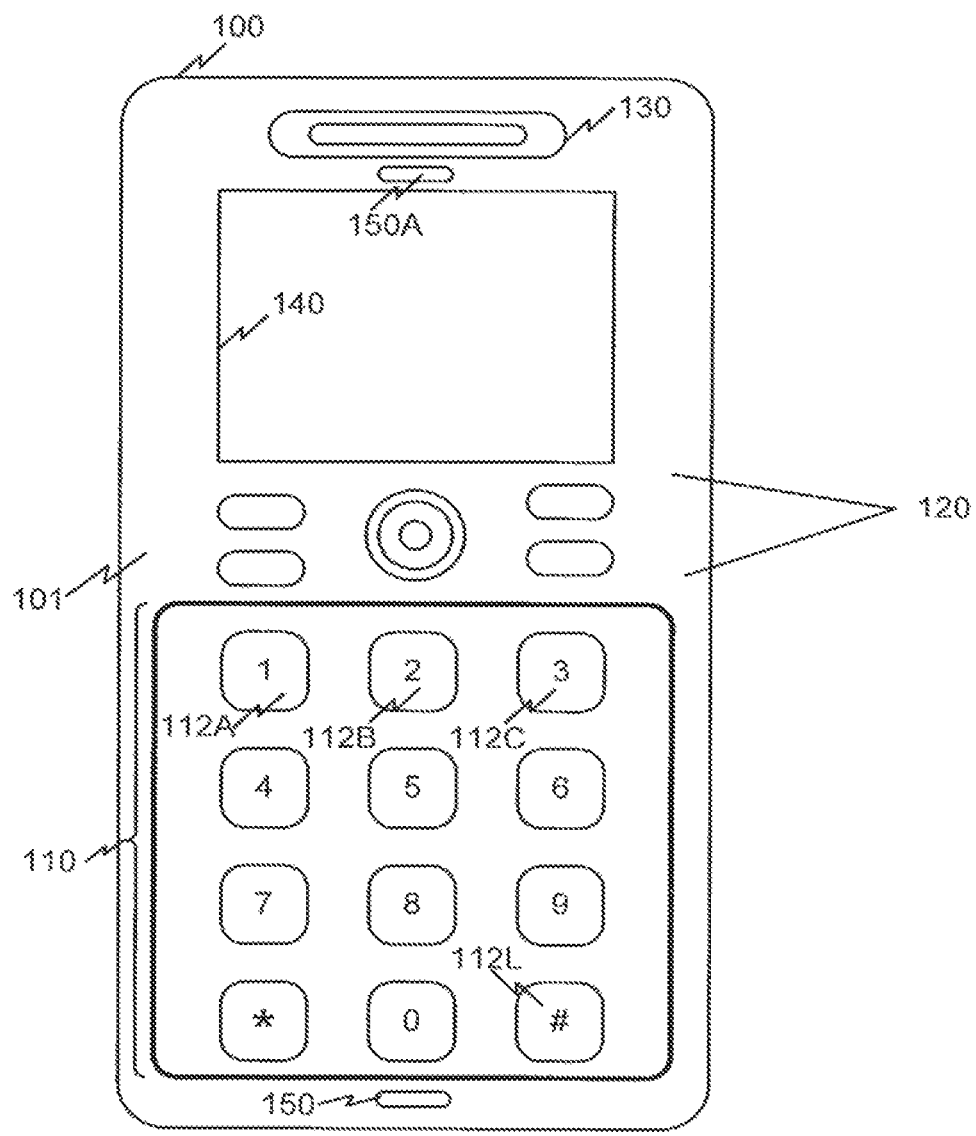
FIG. 1 is a diagram of an exemplary implementation of a mobile terminal.

FIG. 1 is a diagram of an exemplary implementation of a mobile terminal consistent with the principles of the embodiments. Mobile terminal 100 (hereinafter terminal 100) may be a mobile communication device. As used herein, a "mobile communication device" and/or "mobile terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; and a laptop and/or palmtop receiver or other appliance that includes a radiotelephone transceiver.

Terminal 100 may include housing 101, keypad 110 containing keys 112A-L, control keys 120, speaker 130, display 140, and microphones 150 and 150A. Housing 101 may include a structure configured to hold devices and components used in terminal 100. For example, housing 101 may be formed from plastic, metal, or composite and may be configured to support keypad 110, control keys 120, speaker 130, display 140 and microphones 150 and/or 150A.

Keypad 110 may include a plurality of keys 112A-L (collectively keys 112) that may be activated by a user to input information into terminal 100. Implementations of keys 112 may have key information associated therewith, such as numbers, letters, symbols, etc. A user may interact with keys 112 to input key information into terminal 100. For example, a user may operate keys 112 to enter digits, commands, and/or text, into terminal 100.

Control keys 120 may include buttons that permit a user to interact with terminal 100 to cause terminal 100 to perform an action, such as to display a text message via display 140, raise or lower a volume setting for speaker 130, etc.

Speaker 130 may include a device that provides audible information to a user of terminal 100. Speaker 130 may be located in an upper portion of terminal 100 and may lime on as an ear piece when a user is engaged in a communication session using terminal 100. Speaker 130 may also function as an output device for music and/or audio information associated with games and/or video images played on terminal 100.

Display 140 may include a device that provides visual information to a user. For example, display 140 may provide information regarding incoming or outgoing calls, text messages, games, phone books, the current date/time, volume settings, etc., to a user of terminal 100. Implementations of display 140 may be implemented as black and white or color displays, such as liquid crystal displays (LCDs). Display 140 may also include devices and/or logic that can be used to display images to a user of terminal 100 and to receive user inputs in association with the displayed images. For example, display 140 may be configured as a touch sensitive device that may display an image of a keyboard. Implementations of display 140 may be configured to receive a user input when the user interacts with the displayed image. For example, the user may provide an input to display 140 directly, such as via the user's finger, or via other devices, such as a stylus. User inputs received via display 140 may be processed by components or devices operating in terminal 100.

Microphones 150 and/or 150A may, each, include a device that converts speech or other acoustic signals into electrical signals for use by terminal 100. Microphone 150 may be located proximate to a lower side of terminal 100 and may be configured to convert spoken words or phrases into electrical signals for use by terminal 100. Microphone 150A may be located proximate to speaker 130 and may be configured to receive acoustic signals proximate to a user's ear while the user is engaged in a communications session using terminal 100. For example, microphone 150A may be configured to receive background noise as an input signal for performing background noise cancellation using processing logic in terminal 100.

Figure 2:
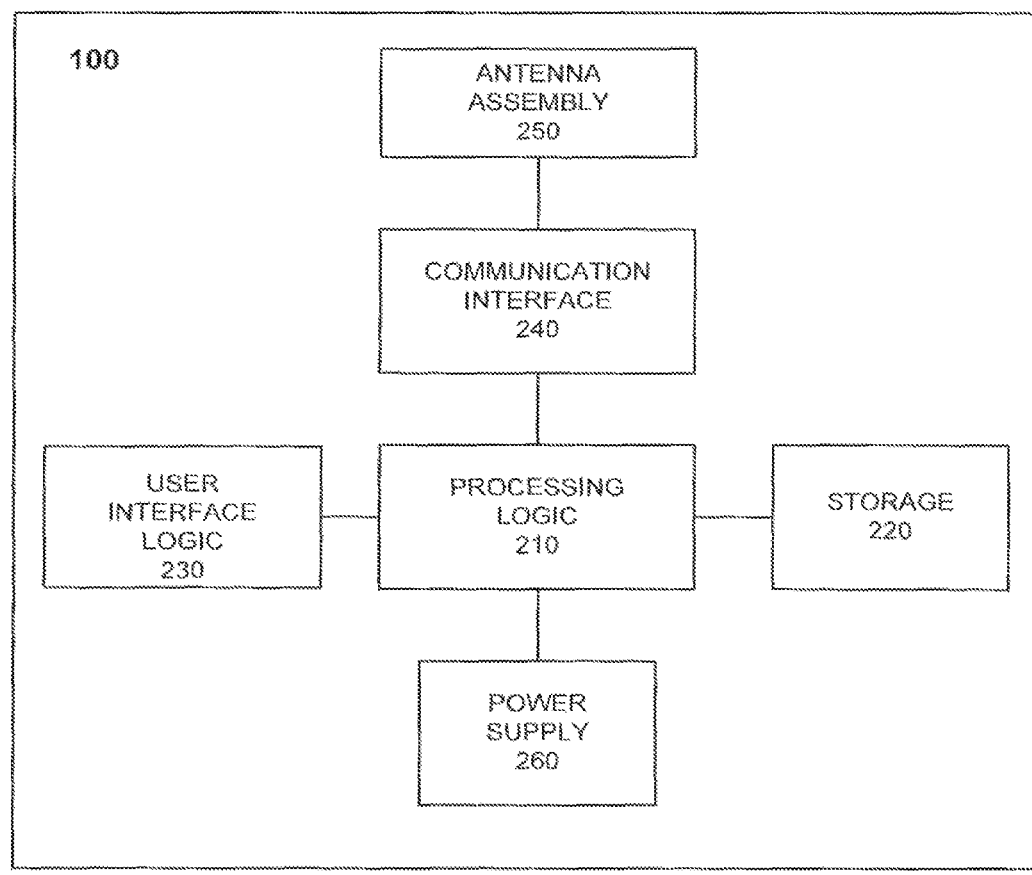
FIG. 2 illustrates an exemplary functional diagram of a mobile terminal.

FIG. 2 illustrates an exemplary functional diagram of mobile terminal 100 consistent with the principles of the embodiments. As shown in FIG. 2, terminal 100 may include processing logic 210, storage 220, user interface logic 230, communication interface 240, antenna assembly 250, and power supply 260.

Processing logic 210 may include a processor, microprocessor, an application specific integrated circuit (ASIC), field programmable gate array (FPGA), or the like. Processing logic 210 may include data structures or software programs to control operation of terminal 100 and its components. Implementations of terminal 100 may use an individual processing logic component or multiple processing logic components, such as processing logic components operating in parallel. Storage 220 may include a random access memory (RAM), a read only memory (ROM), a magnetic or optical disk and its corresponding drive, and/or another type of memory to store data and instructions that may be used by processing logic 210.

User interface logic 230 may include mechanisms, such as hardware and/or software, for inputting information to terminal 100 and/or for outputting information from terminal 100. User interface logic 230 may include mechanisms, such as hardware and/or software, used to configure an appearance of display 140 and/or to receive user inputs via display 140 and keypad 110. For example, user interface logic 230 may control display 140 to display a keyboard of characters such as a "QWERTY" type of keyboard, or another type of keyboard. User interface logic 230 may also include hardware or software to accept user inputs to make information available to a user of terminal 100. For example, a keyboard may be displayed via display 140 and a user may use a finger or stylus to exert pressure on the display 140 indicating selection of a displayed key within the keyboard. Further examples of input and/or output mechanisms associated with user interface logic 230 may include a speaker (e.g., speaker 130) to receive electrical signals and output audio signals, a microphone (e.g., microphone 150 or 150A) to receive audio signals and output electrical signals, buttons (e.g., control keys 120) to permit data and control commands to be input into terminal 100, and/or a display (e.g., display 140) to output visual information.

Communication interface 240 may include, for example, a transmitter that may convert base band signals from processing logic 210 to radio frequency (RF) signals and/or a receiver that may convert RF signals to base band signals. Alternatively, communication interface 240 may include a transceiver to perform functions of both a transmitter and a receiver. Communication interface 240 may connect to antenna assembly 250 for transmission and reception of the RF signals. Antenna assembly 250 may include one or more antennas to transmit and receive RF signals over the air. Antenna assembly 250 may receive RF signals from communication interface 240 and transmit them over the air and receive RF signals over the air and provide them to communication interface 240.

Power supply 260 may include one or more power supplies that provide power to components of terminal 100. For example, power supply 260 may include one or more batteries and/or connections to receive power from other devices, such as an accessory outlet in an automobile, an external battery, or a wall outlet. Power supply 260 may also include me logic to provide the user and components of terminal 100 with information about battery charge levels, output levels, power faults, etc.

As will be described in detail below, terminal 100, consistent with the principles of the embodiments, may perform certain operations relating to adaptively configuring display 140 in response to user inputs or in response to instructions associated with processing logic 210. Terminal 100 may perform these operations in response to processing logic 210 executing software instructions of a keypad configuration/programming application contained in a computer-readable medium, such as storage 220. A computer-readable medium may be defined as a physical or logical memory device and/or carrier wave.

The software instructions may be read into storage 220 from another computer-readable medium or from another device via communication interface 240. The software instructions contained in storage 220 may cause processing logic 210 to perform processes that will be described later. Alternatively, hardwired circuitry may be used in place of or in combination with software instructions to implement processes consistent with the principles of the embodiments. Thus, implementations described herein are not limited to any specific combination of hardware circuitry and software.

Figure 3:
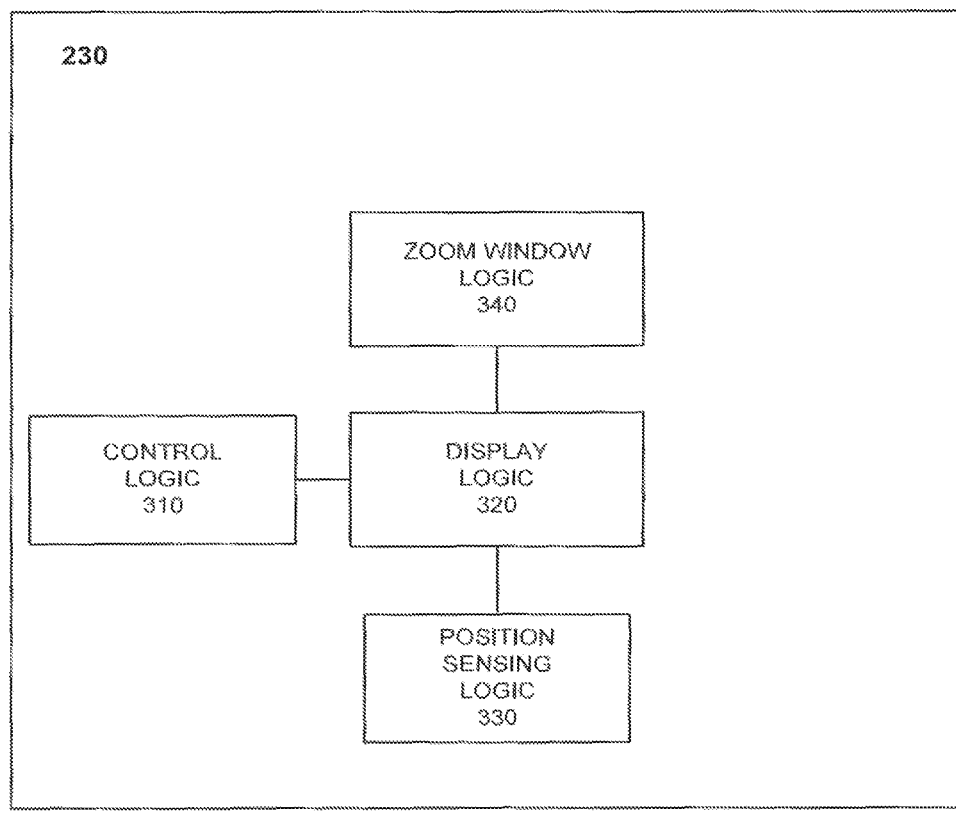
FIG. 3 illustrates an exemplary functional diagram of the user interface logic of FIG. 2.

FIG. 3 illustrates an exemplary functional diagram of the user interface logic 230 of FIG. 2. User interface logic 230 may include control logic 310, display logic 320, position sensing logic 330 and zoom window logic 340.

Control logic 310 may include logic that controls the operation of display logic 320, logic operating with display logic 320, and/or processes involved with display logic 320. Control logic 310 may be implemented as standalone logic or as part of processing logic 210. Moreover, control logic 310 may be implemented in hardware or software. Control logic 310 may receive inputs via keys 112 and may receive signals from processing logic 210 to provide images to be displayed via display 140 and/or said signals to display logic 320.

Display logic 320 may include logic to present information to a user of terminal 100. Display logic 320 may include processing logic to interpret signals and instructions and a display device (such as display 140) having a display area to provide information to a user of terminal 100. For example, display logic 320 may receive image signals from control logic 310, such as a user interface screen displaying a plurality of choices to be displayed. Display logic 320 may also receive signals from position sensing logic 330 and provide a cursor on display 140 based on the received position signals. Display logic 320 may also determine selections of information displayed, by comparing locations of displayed information and input position signals received from position sensing logic 330 relating to a position on display 140 that may be touched by a user.

Implementations of display logic 320 may also include mediums that change properties as light passes through the mediums, or display logic 320 may include mediums that reflect light. For example, one implementation of display logic 320 may include a liquid crystal display (LCD) technology that includes, for example, biphenyl or another stable liquid crystal material. LCD based implementations of display logic 320 may include thin film transistor (TFT) LCDs that may include a liquid crystal structure placed between two glass plates that can be charged to cause changes in the liquid crystal structure so as to change color characteristics of light passing through the liquid crystal structure. Implementations employing LCD based technologies may use back lighting or front lighting to enhance the appearance of images produced by display logic 320.

Display logic 320 may also include logic to provide illumination to an upper surface of a display device or a lower surface of a display device. For example, display logic 320 may be used to provide front lighting to an upper surface of a display device (such as display 140) that faces a user. Front lighting may enhance the appearance of a display device by making information on the display device more visible in high ambient lighting environments, such as viewing a display device outdoors. Display logic 320 may also be used to provide backlighting to a lower surface, or rear surface, of a display device, such as a surface of a display device that faces away from a user. Backlighting may be used with LCD based implementations of a display device to make images brighter and to enhance the contrast of displayed images. Implementations of display logic 320 may employ light emitting diodes (LEDs) or other types of devices to illuminate portions of a display device.

Position sensing logic 330 may include logic that senses the position of an object. For example, position sensing logic 330 may be configured to determine the location on display 140 where a user places his/her finger regardless of how much pressure the user exerts on display 140. In one implementation, position sensing logic 330 may include a transparent or semi-transparent film that can be placed over display 140. The film may be adapted to change an output, such as a voltage or current, as a function of an amount of pressure exerted on the film and/or based on a location where pressure is exerted on the film. For example, assume that a user presses on the film in an upper left hand corner of the film. The film may produce an output that represents the location at which the pressure was detected. Implementations of position sensing logic 330 may use thermal, pressure, vibration, location, etc., sensing techniques to identify and receive inputs. Position sensing logic 330 may also use capacitive, resistive, inductive, optic, etc., based sensing devices to identify the presence of an object and to receive an input via the object. Position sensing logic 330 may send a signal to display logic 320 indicating the determined position of input, for example.

Zoom window logic 340 may include hardware and/or software to provide a window of enlarged information via display 140. For example, zoom window logic 340 may receive a signal from position sensing logic 330 that identifies or determines a place on display 140 where an input may be received. Zoom window logic 340 may also receive signals from display logic 320 related to an image or information currently being displayed via display 140. Zoom window logic 340 may then use the received position and image signals to provide a window for enlarged images that may be located at the position of input on display 140 that may have been touched by a user. For example, if a displayed image on display 140 is a menu of choices, zoom window logic 340 may provide a zoom window that contains an enlarged or magnified view of the choices in the menu.

Figure 4:
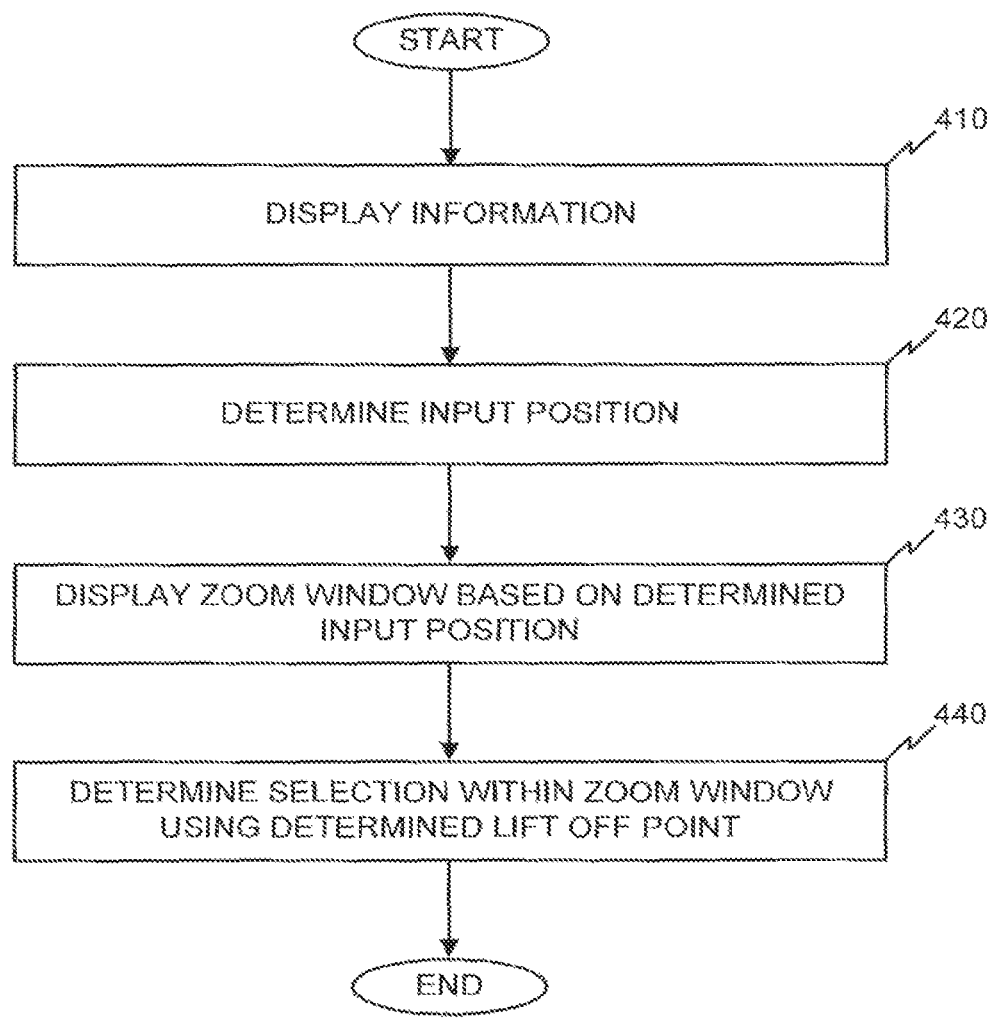
FIG. 4 is a flowchart illustrating an exemplary process.

FIG. 4 is a flowchart of exemplary processing consistent with the principles described herein. Process 400 may begin when information is displayed to a user of terminal 100 (block 410). For example, terminal 100 may be running an application, such as an email or text messaging application, where processing logic 210 and/or user interface logic 230 may generate a user interface screen that includes information and/or menus to be displayed via display 140 in order to allow a user to create and send an email or text message.

While displaying a user interface and/or information, terminal 100 may sense and determine a position of input (block 420). For example, a user may press down with his/her finger on a specific location on the surface of display 140 which may be determined by position sensing logic 330. As described above, position sensing logic 330 may determine the exact position on the surface of display 140 that is being contacted. Position sensing logic 330 may then send a signal to display logic 320 and zoom window logic 340 indicating the determined position of input. Based on the determined input position, zoom window logic 340 may provide a window of enlarged information based on the determined position (block 430). An example of providing a zoom window of enlarged information (block 430) is shown in FIG. 5.

Figure 5:
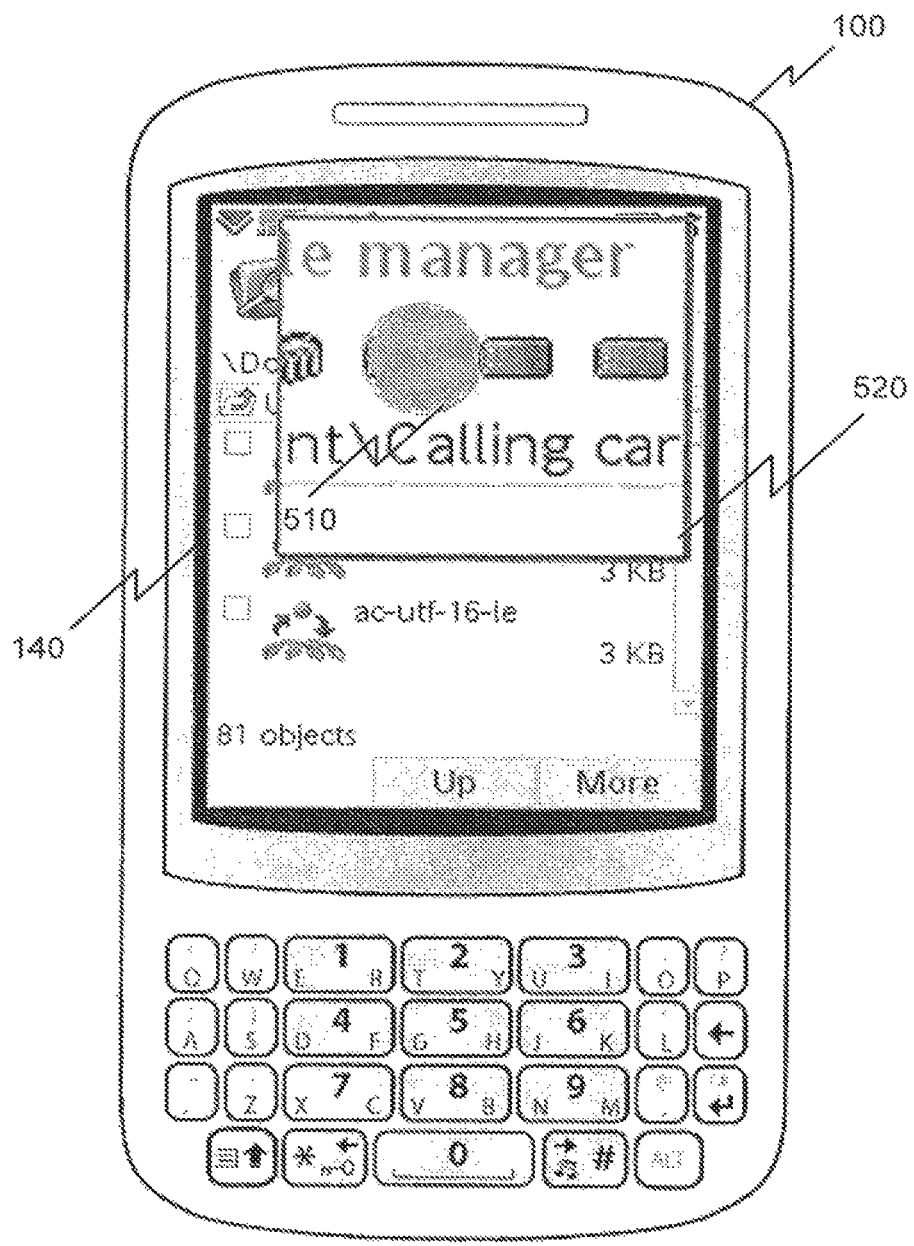
FIG. 5 illustrates an example of the process of FIG. 4.

As shown in FIG. 5 for example, a user of terminal 100 may be presented with an interface screen via display 140. When a user touches display 140, the location or position of input, shown as circle 510, is determined by position sensing logic 330. The determined input position signal may then be sent to zoom window logic 340 in order to provide zoom window 520. For example, the information contained in zoom window 520 is enlarged information (e.g., magnified in size by two to three or more times from the originally displayed interface screen) that is in close proximity (e.g., at or slightly offset) to the determined input position determined by position sensing logic 330. A user preference setting may allow zoom window 520 to be displayed to the left of the determined input position for right-handed users and to the right of the determined input position for left-handed users. Specifically in this example, zoom window 520 contains some text from the originally displayed interface screen and three icons indicating storage areas, where the position of input, shown as circle 510, is directly above (covering) one of the storage area icons. It should be understood that circle 510 is shown for illustrative purposes only and may not be shown on display 140.

Continuing with this example, an input position may continue to be monitored and determined within the zoom window 520. For example, position sensing logic 330 may continue to monitor and determine the (input) position of a user's finger while it moves across the surface of display 140. A user may then move their finger within zoom window 520 to directly cover a desired input selection, such as an icon or choice within a displayed menu, for example. Once a user's finger is directly over the input selection, by lifting his/her finger up off the surface of display 140, an input selection may be determined by using the monitored lift off point within the zoom window 520 (block 440). Alternatively, an input selection may be determined when the user presses more firmly on a particular part of zoom window 520 or taps zoom window.

For example, zoom window logic 340 may use input position signals received from position sensing logic 330 to determine what information (desired input selection) was displayed in the zoom window 520 that directly corresponded to the monitored lift off point within zoom window 520. In this example, if the user lifted his/her finger off the surface of display 140 over the first storage icon (shown as circle 510) this first icon may be received as a desired input selection by terminal 100 (block 440). In another example of receiving a desired input selection, a matching point (selection) on the original screen may be calculated using knowledge of the position and scaling of zoom window 520, without referring to information displayed in zoom window 520 (block 440). Additionally, after receiving the input selection based on the determined position of lift off, terminal 100 may remove zoom window from display 140 and simulate the input selection on the original interface screen, for example.

In other examples, the input selection may be received (block 440) with a determined input position that is outside the zoom window 520. For example, if zoom window 520 displays three icons and a user moves his/her finger horizontally to the right and beyond zoom window 520, display logic 320 may determine that the rightmost icon is the desired selection (block 440). In another example, if a user moves his/her finger outside the zoom window 520, a new zoom window may be created that contains information (from the original display screen) based on the user's new finger position (block 430). In this example, with a moving, or dragged zoom window, an input selection may be received when a user taps a desired input selection within the zoom window (block 440). In other examples, a stylus or input pen may also be used (in place of or in addition to) a user's finger to select inputs from displayed zoom windows. For example, a user's finger may be used in blocks 420-430 and an input selection may be made by tapping a stylus or pen in a provided zoom window (block 440).

In still further examples, additional icons and/or information may be added to zoom window 520. For example, additional cons may be added around the edges of zoom window 520. Some examples of additional icons may be a "page-up" and "page-down." icons. A user may select one of these icons in any manner as described above, for example, touching on, pausing on, or lifting off the icon. In other examples a "page-up" icon may be selected when the position of a user's finger is determined (by position sensing logic 330) to leave the top of zoom window 520. Similarly, a "page-down" icon may be selected when the position of a user's finger is determined to leave the bottom of zoom window 520.

Figure 6A:
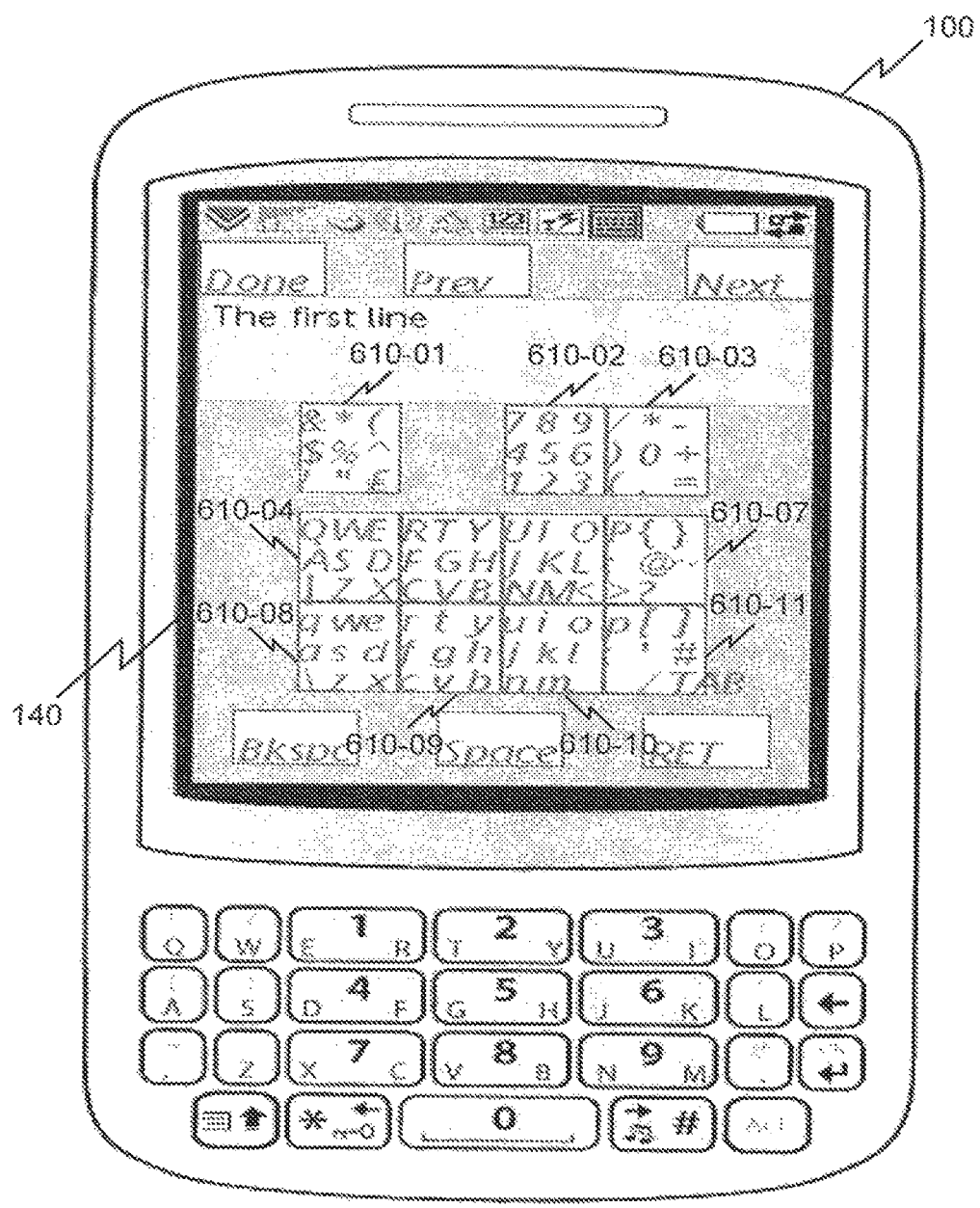
FIGS. 6A-6B illustrate other examples of the process of FIG. 4.
Figure 6B:
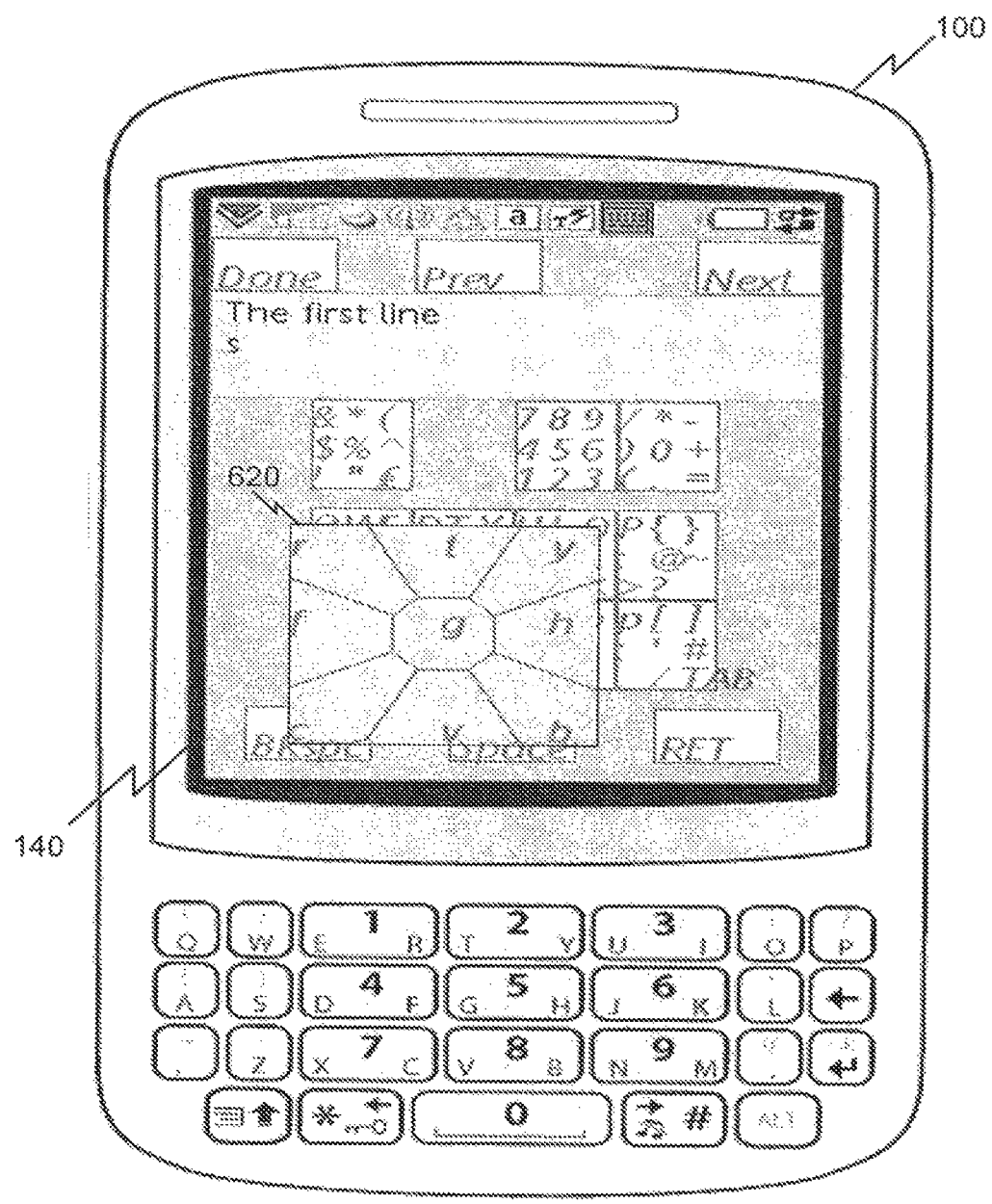

Another example of process 400 may be described with reference to FIGS. 6A-6B. In this example, terminal 100 includes a display 140 that may provide a number of groups of characters 610-01 to 610-11 (collectively referred to as character groups 610). In this example, when displayed in the manner shown, characters groups 610 form upper case and lower case "QWERTY" type keyboards (block 410). This displayed user interface that contains character groups 610 may be presented to a user while terminal 100 is running an email or text messaging application, for example. In order to select a character, a user may touch a character group 610 currently displayed via display 140. When the user's finger contacts the surface of display 140, the position of input is determined by position sensing logic 330 (block 420). Position sensing logic 330 may send a signal indicating the input position to zoom window logic 340 and a window containing enlarged information may be provided (block 430). As shown in FIG. 6B for example, a user may have touched character group 610-09 (as shown in FIG. 6A) and zoom window 620 may be provided by zoom window logic 340 based on the signal from position sensing logic 330 indicating that the position of input corresponded to character group 610-09. In this example, zoom window 620 contains enlarged characters (r, t, y, f, g, h, c, v and b) that are contained in character group 610-09.

After zoom window 620 is provided, a user may move his/her finger over a desired selection displayed within the zoom window 620. For example, position sensing logic 330 may continue to monitor and determine the (input) position of a user's finger while it moves across the surface of display 140. A user may then move his/her finger within zoom window 620 to directly cover a desired input selection, such as one of characters r, t, y, f, g, h, c, v and b, for example. Once a user's finger is directly over the desired character, by lifting his/her finger up off the surface of display 140, an input selection may be determined by using the monitored lift off point within the zoom window 620 (block 440).

For example, zoom window logic 340 may use input position signals received from position sensing logic 330 to determine what character (desired input selection) was displayed in the zoom window 620 that directly corresponded to the monitored lift off point within zoom window 620. In this example, if the user lifted his/her finger off the surface of display 140 over the "t" character, a "t" may be received as the input selection by terminal 100 (block 440).

In further embodiments, the selection from the zoom window 620 may be determined from a point of lift off which may not be within zoom window 620 (block 440). For example, if zoom window 620 is displayed, a user may select the "t" character by moving his/her finger straight up from the center of zoom window 620 and lift his/her finger off the surface of display 140 at some point directly above the "t" character. In a similar manner, if zoom window 620 is displayed, a user may select the "h" character by moving his/her finger horizontally from the center of zoom window 620 and lift his/her finger off the surface of display 140 at some point to the right of the "h" character. In this manner, zoom window 620 may divide display 140 into angular sections, where each character may be associated with an angular section of display 140. In another example, an input selection may be received when a user's finger leaves the zoom window area. It should be understood that the number of characters or letters shown in character groups 610 is exemplary only. More or less characters may be contained and displayed in a character group. In addition, other shapes such as rectangular or triangular shapes may be used to segment individual characters in character groups 610.

In another example, zoom windows may not be displayed and a user may select a character within a character group 610 by moving his/her finger in a manner as described above. For example, with the character groups displayed as shown in FIG. 6A, if a user touches character group 610-04 and moves his/her finger horizontally to the left across the surface of display 140, the "A" character may be selected without enacting block 430 (i.e., without providing zoom a window).

In another embodiment, if a user touches a character group on display 140 (blocks 410-420), a zoom window of candidate next words may be provided (block 430). In this example, process 400 may be enacted for word prediction purposes, where the most frequently used words that start with characters within the selected group may be displayed as input selections. In another example, if a user selects character group 610-10, and then selects the character "k," in a manner as described above, another zoom window of frequently used words that begin with "k" may be provided as input selections.

In still further embodiments, after determining an input selection in block 440, process 400 may continue with block 410 if the input selected in block 440 requires or produces further selections of choices. For example, a user may be presented with a number of cascaded interface screens in order to perform an operation, where process 400 may perform processing associated with blocks 410-440 for each of the number of interface screens and zoom windows may be provided as appropriate. It should be understood that with cascaded interface screens, methods of input selection (block 440) may also include pausing on an input selection and determining an input selection immediately upon detecting the presence of a user's finger on a selection.

An example of multiple iterations of process 400 may be used for entering Chinese characters. Using a Wubizixing input method for Chinese characters, a user may first select from live root character groups, "left-falling," "right-falling," "horizontal," "vertical" and "hook," where each of these five root character groups may be choices provided on an interface screen (block 410). Once a user touches display 140 selecting information or an icon representing one of the five character groups, a zoom window may be provided that includes further choices to be made (blocks 420-430). For example, if a user selects the "horizontal" character group, a zoom window containing five classifications of horizontal root characters may be displayed. One of the five classifications of horizontal root characters may include a choice of characters that contain one horizontal stroke, for example. If a user selects characters that contain one horizontal stroke (block 440), another user interface screen (or zoom window) may be provided with further information and/or selections to be made, such as an interface window displaying four brush stroke type groups. Continuing with this example, another menu containing further (additional) strokes may be provided based on the previous selections related to the root character selected and one horizontal stroke. In this manner, additional choices (provided via additional interface screens and/or zoom windows) may be provided until a Chinese character may be determined and selected. In this manner, process 400 may be enacted as many times as is necessary (based on the amount of selections to be made) in order to allow a user to select a desired character (or other information) from a user interface screen. As described above, the input selection (block 440) may be received using any of the above examples of selection, for example, such as touching or pausing on the input selection, in addition in lifting off the selection.

Figure 7:
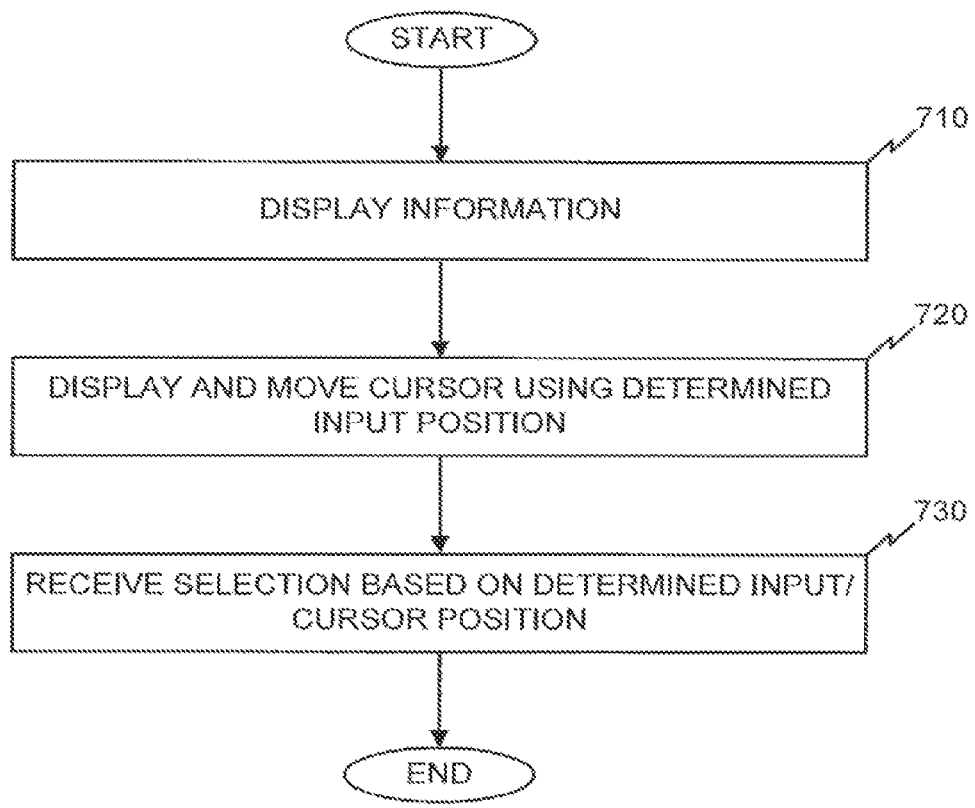
FIG. 7 is a flowchart illustrating another exemplary process.

FIG. 7 is a flowchart of exemplary processing consistent with the principles described herein. Process 700 may begin when information is displayed to a user of terminal 100 (block 710). For example, terminal 100 may be running an application, such as an email or text messaging application, where processing logic 210 and/or user interface logic 230 may generate a user interface screen that includes information and/or menus to be displayed via display 140 in order to allow a user to create and send an email or text message.

While displaying a user interface and/or information, terminal 100 may display and move a cursor using a monitored position of input (block 720). For example, a user may press down with his/her finger on a specific location on the surface of display 140 which may be determined by position sensing logic 330. As described above, position sensing logic 330 may determine the exact position on the surface of display 140 that is being contacted. Position sensing logic 330 may then send a signal to display logic 320 indicating the determined position of input. Based on the determined input position, display logic 320 may display a cursor based on the determined position of input (block 720). An example of displaying a cursor is shown in FIG. 8.

Figure 8:
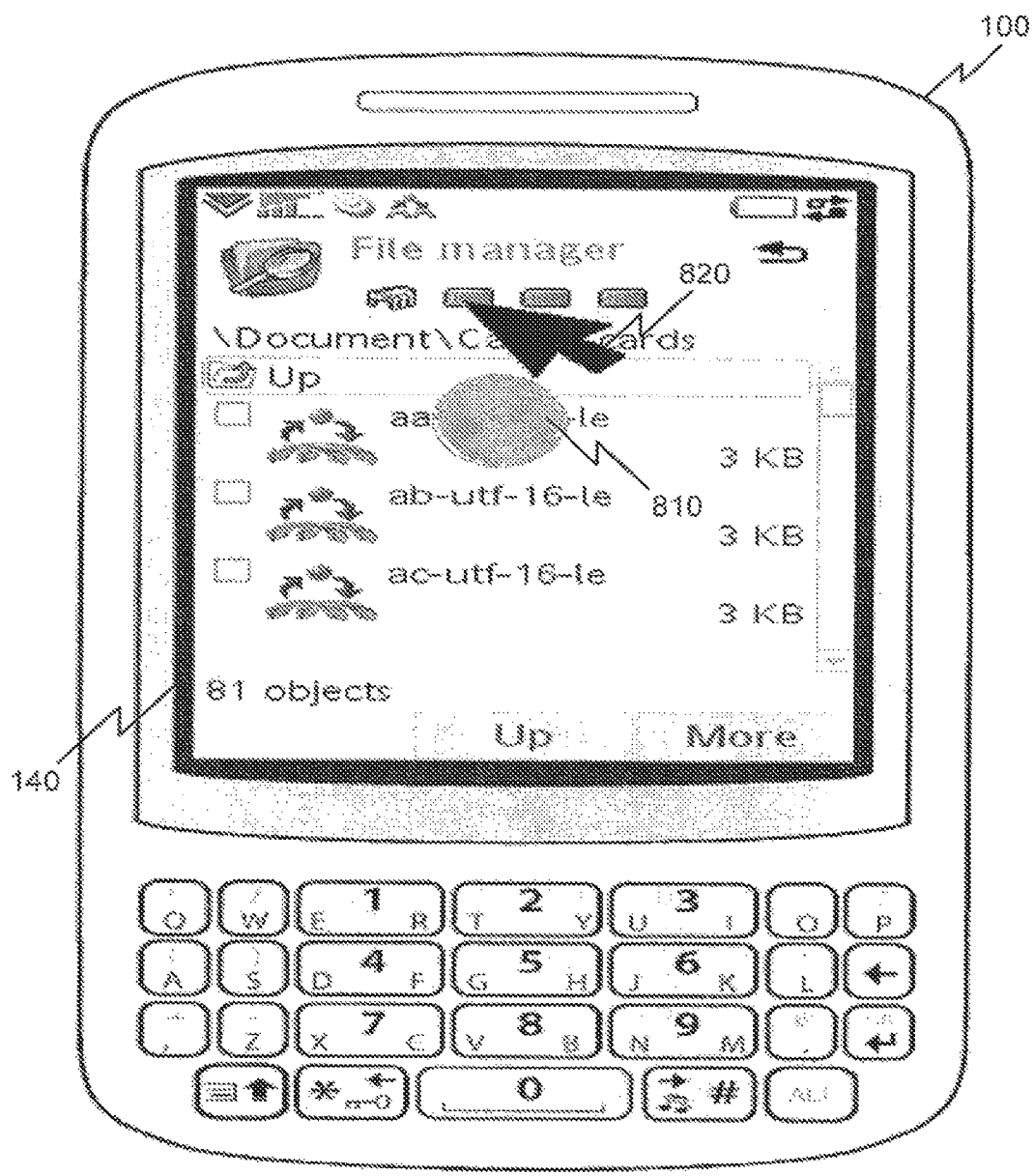
FIG. 8 illustrates an example of the process of FIG. 7.

As shown in FIG. 8 for example, a user of terminal 100 may be presented with an interface screen via display 140. When a user touches display 140, the location or position of input, shown as circle 810, is determined by position sensing logic 330. The determined input position signal may then be sent to display logic 320 in order to provide a cursor 820. For example, cursor 820 may be displayed adjacent (offset from) the input position (810) so that the user may clearly see cursor 820. In this example, a user may be storing a document using an interface screen (similar to FIG. 5) that includes three icons indicating storage areas. It should be understood that circle 810 is shown for illustrative purposes only and may not be shown on display 140.

Continuing with this example, an input position (810) may continue to be monitored and determined. For example, position sensing logic 330 may continue to monitor, determine and follow the (input) position of a user's finger while it moves across the surface of display 140. A user may then move his/her finger such that cursor 820 is directly over a desired input selection, such as an icon or choice within a displayed menu, for example. Once cursor 820 is directly over a desired input selection, a user's finger may be lifted off the surface of display 140 to indicate an input selection (block 730). In this manner, terminal 100 may display a cursor adjacent to a position of input in order to allow a user to select information presented on an interface screen. It should be understood that the offset position of the cursor shown in FIG. 8 is exemplary only and that cursor 820 may be below, left, or right of the position of input (810). In other examples, additional icons and/or information may be provided when a user touches display 140 and these additional icons and/or information may also be selected with cursor 820.

In further examples, process 400 or 700 may be employed for dragging events. For example, a user may use a zoom window or cursor and process 400 or 700 (as previously described) to select a scroll bar on display 140. If a user quickly retouches display 140, this may be received by position sensing logic 330 and then a signal may be sent to display logic 320 to instigate a drag mode. User finger drag events may be received by position sensing logic 330 and mapped by display logic 320 into signals used to drag the scroll bar so as to follow the finger. When the scroll bar is in the desired position (as determined by the user), a user may lift their finger off the surface of display 140, where the position of the scroll bar may be received as an input.

Figure 9:
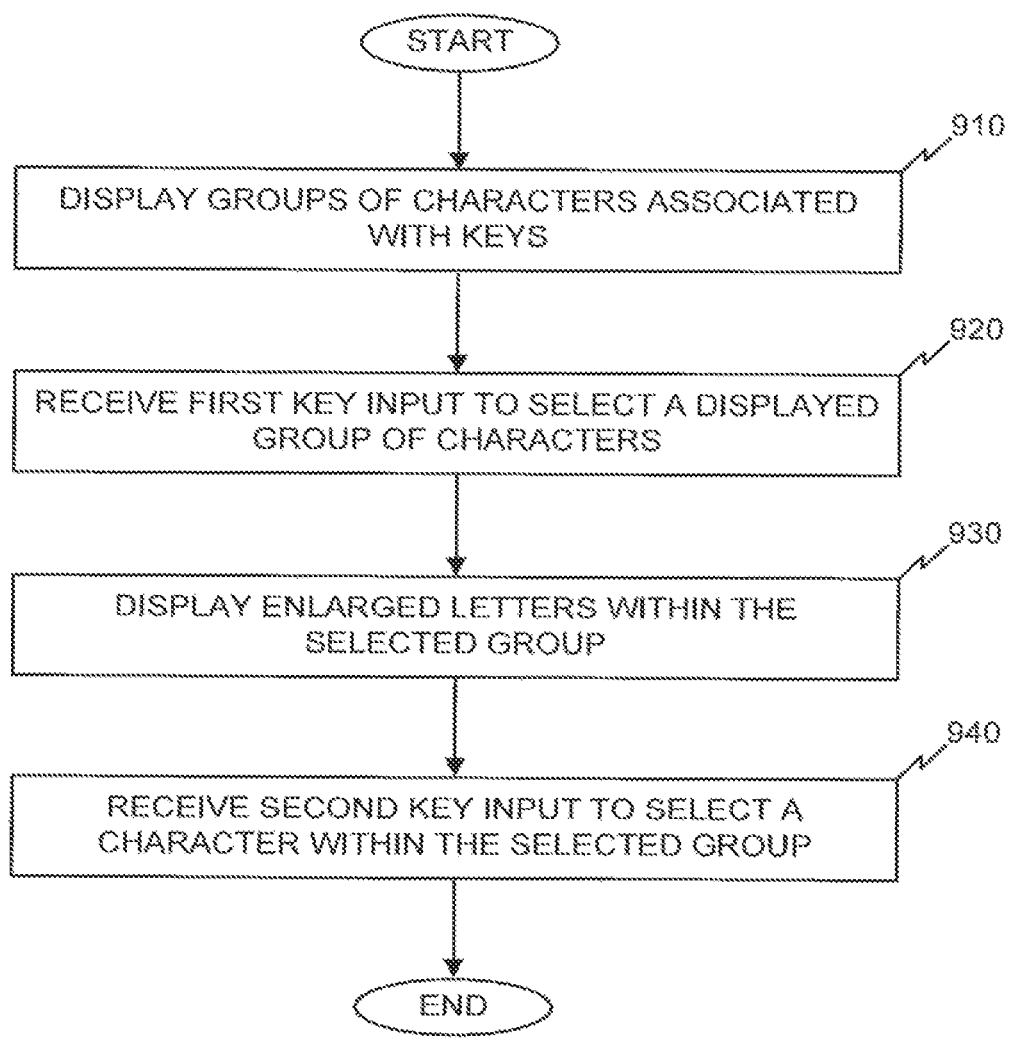
FIG. 9 is a flowchart illustrating another exemplary process.
Figure 10A:
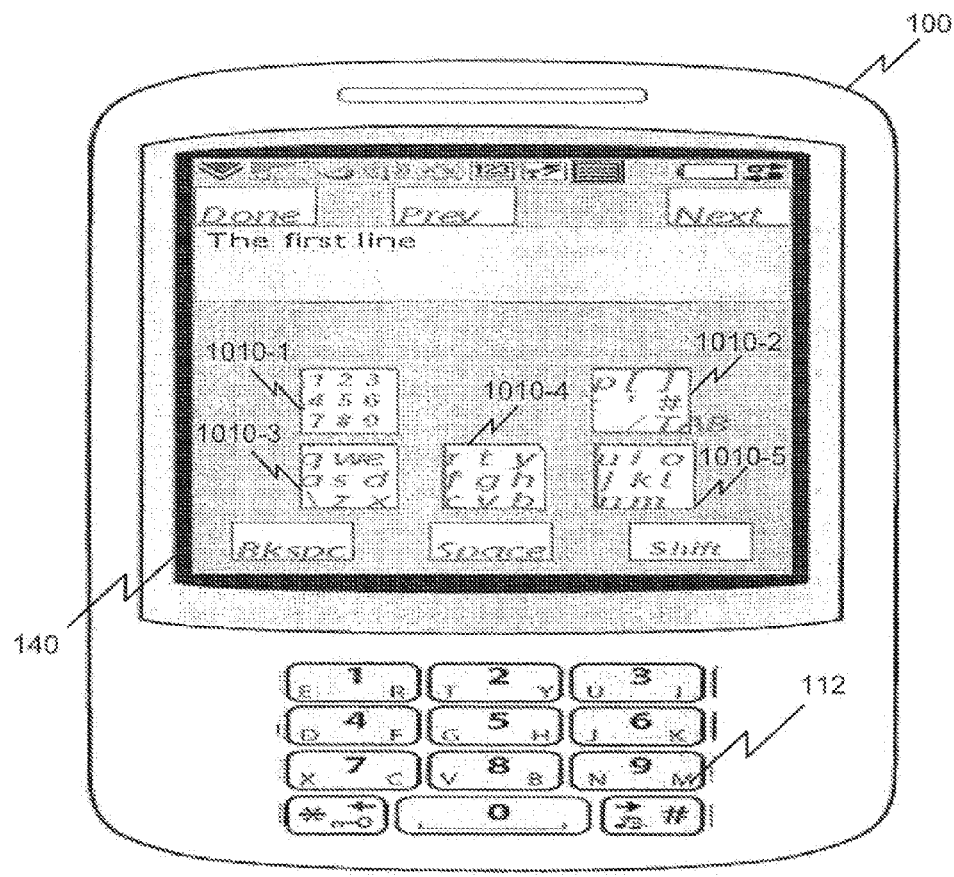
FIGS. 10A-10B illustrate examples of the process of FIG. 9.

FIG. 9 is a flowchart of exemplary processing consistent with the principles described herein. Process 900 may begin when groups of characters are displayed to correspond to keys on terminal 100 (block 910). As shown in FIG. 10A, terminal 100 includes a display 140 that may provide a number of groups of characters 1010-01 to 1010-5 (collectively referred to as character groups 1010). In this example, when displayed in the manner shown, characters groups 1010-2 to 1010-5 form a "QWERTY" type keyboard. As described above, this displayed user interface that contains character groups 1010 may be presented to a user while terminal 100 is running an email or text messaging application, for example.

In this exemplary embodiment, a total of nine character groups 1010 may be displayed at any one time, where the displayed locations of each character group 1010 corresponds to physical locations of the keys labeled "1" to "9" in keys 112. In the example shown in FIG. 10A, the displayed location of character group 1010-1 corresponds to the "4" key, the location of character group 1010-2 corresponds to the "6" key, the location of character group 1010-3 corresponds to the "7" key, the location of character group 1010-4 corresponds to the "8" key and the location of character group 1010-5 corresponds to the "9" key. Other numbers of character groups may be displayed in alternative implementations.

Figure 10B:
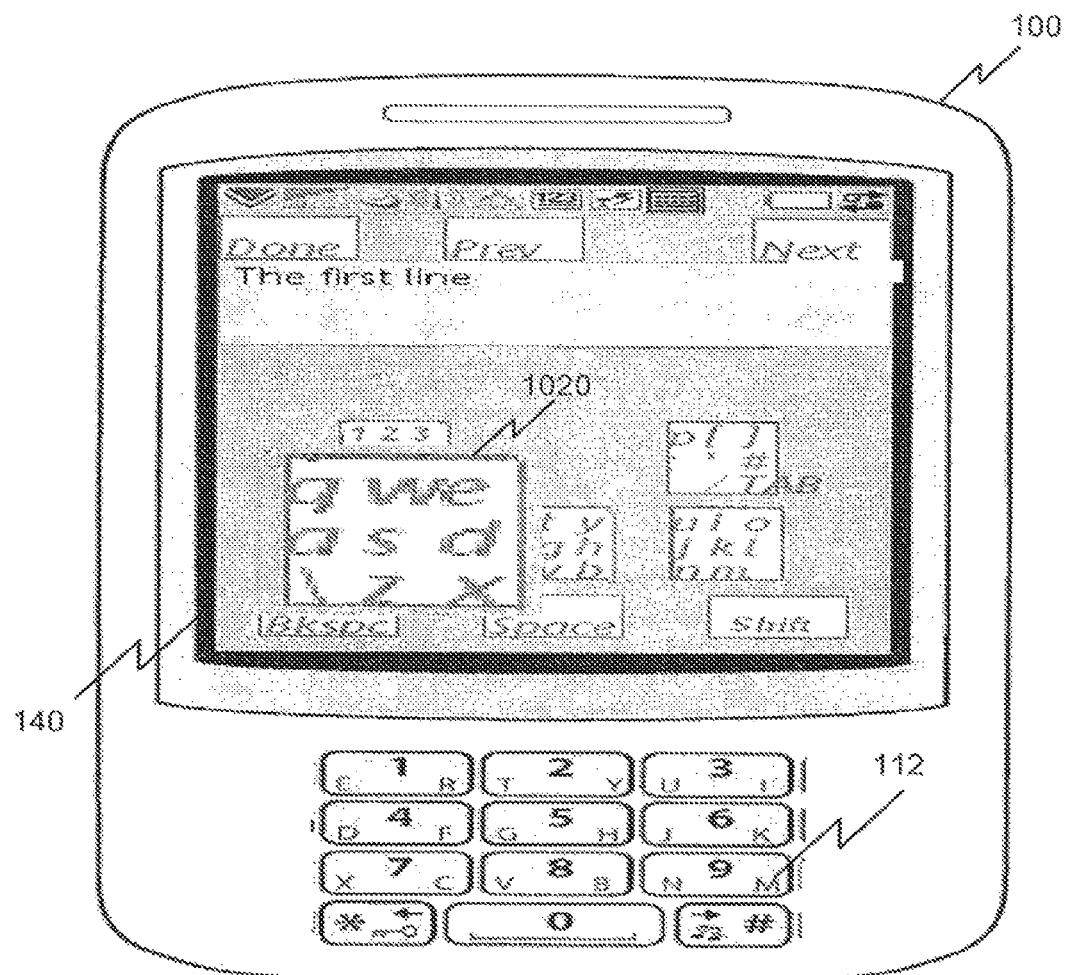

In order to select a letter, a user may depress the key associated with the displayed character group 1010 that contains the desired letter. When the user depresses a key, this input may be received as a selection of a displayed character group (block 920). For example, if a user desires to input a 37 s," the "7" key may be depressed. In response to terminal 100 receiving this input, the selected character group 1010-3 is enlarged (block 930). Continuing with this example, FIG. 10B shows selected character group (1010-3) displayed as enlarged text within zoom window 1020. In this example, control logic 310 may send a signal indicating that the "7" key has been depressed to zoom window logic 340 and a window containing enlarged letters (associated with the "7" key) may be provided (block 930).

As shown in FIG. 10B for example, zoom window 1020 contains enlarged characters q, w, e, a, s, d, \, z and x that are contained in character group 1010-3. After a zoom window is provided, a user may depress a key to select a particular letter within zoom window 1020. When a user depresses a key, this may be received as an input selection of a letter within the display character group (block 940). In this example, the displayed location of the letters within zoom window 1020 also corresponds to the physical locations of keys 112. For example, the "1" key corresponds with "q," the "2" key corresponds with "w," the "3" key corresponds with "e," the "4" key corresponds with "a," the "5" key corresponds with "s," the "6" key corresponds with "d," the "7" key corresponds with "\," the "8" key corresponds with "z," and the "9" key corresponds with "x." If, for example, a user depresses the "5" key, control logic 310 may determine that the "5" key of keys 112 has been depressed and control display 140 to display an "s".

In other examples, process 900 may be enacted without block 930. For example, a user may depress a first key to select a character group (block 920) and then may depress a second key to select a letter from the selected character group (block 940) without providing a zoom window of the character group 1010 selected in block 920. In further examples, process 900 may continue with block 920 (after block 940) when cascaded character groups may be required.

It should be understood that the exemplary embodiments and user interface screen shown and described above are for illustrative purposes and should not be limited to those examples described. Additionally, terminal 100 may control and may automatically re-configure the appearance of display 140 based on an application being launched by the use of terminal 100, the execution of a function associated with a particular application/device included in terminal 100 or some other application specific event. For example, if terminal 100 includes a media player and the user begins using the media player, user interface logic 230 may change the appearance of display 140 to provide inputs related to the media player. In another instance, terminal 100 may include a camera function. If the user of terminal 100 presses a shutter button associated with the camera, terminal 100 may change the appearance of display 140 to tailor the display for the camera functionality.

CONCLUSION

Implementations consistent with the principles of the embodiments may facilitate providing a number of user interface systems and methods for user input.

The foregoing description of the preferred embodiments provides illustration and description, but is not intended to be exhaustive or to limit the embodiments to the precise form disclosed. Modifications and variations are possible in light of the above teachings or may be acquired from practice of the embodiments.

While series of acts have been described with regard to FIGS. 4, 7 and 9, the order of the acts may be modified in other implementations consistent with the principles of the embodiments. Further, non-dependent acts may be performed in parallel.

It will be apparent to one of ordinary skill in the art that aspects of the embodiments, as described above, may be implemented in many different forms of software, firmware, and hardware in the implementations illustrated in the figures. The actual software code or specialized control hardware used to implement aspects consistent with the principles of the embodiments is not limiting. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as hardwired logic, an application specific integrated circuit, a field programmable gate array, a processor or a microprocessor, software, or a combination of hardware and software.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A mobile communication device, comprising:
    a touch sensitive display; and
    a processor configured to:
        display, in a first window of the touch sensitive display, first information to a user,
        display, in a second, different window of the touch sensitive display, enlarged information based on a determined first position of input on the touch sensitive display, the displayed enlarged information corresponding to a first portion of the displayed first information displayed in the first window, the second window being displayed simultaneously with the first window and in a position that is offset from the displayed first window,
        detect, via the second window, selection of second information, from the displayed enlarged information, based on a determined second position of input within the second window, and
        display, in a third window different from each of the first and the second windows, in response to the selection of the second information, second enlarged information corresponding to the second information,
        wherein the third window is displayed simultaneously with the first and the second windows, and in a position that is offset from the displayed first and second windows.

2. The mobile communication device of claim 1, wherein the displayed first information includes a plurality of selectable information.

3. The mobile communication device of claim 2, wherein the enlarged information includes at least a plurality of words based on the first information.

4. The mobile communication device of claim 1, wherein the determined position of input within the second window is determined based on a position of a finger of a user or a stylus on the touch sensitive display.

5. The mobile communication device of claim 1, wherein the processor is further configured to:
    display, a cursor on the display based on the determined first position of input on the touch sensitive display; and
    add icons or additional information to the second window based on a change in a position of the cursor.

6. A method comprising:
    displaying a plurality of words via a first window of a touch sensitive display;
    determining a position of input on the touch sensitive display;
    detecting, based on the determined position of input, selection of at least one of a first plurality of words from the displayed plurality of words;
    displaying, based on the detected selection of the first plurality of words, a second, different window that includes enlarged words, the enlarged words corresponding to words included in the at least one of the first plurality of words, the second window being displayed concurrently with the first window and in a position that is offset from the displayed first window;
    detecting selection of a first enlarged word, within the second window based on at least one of a determined position of input within the second window or a determined position of input outside the second window; and
    displaying, in a third window different from each of the first and the second windows, in response to the selection of a first enlarged word, second enlarged information corresponding to the selection of the first enlarged word,
    wherein the third window is displayed simultaneously with the first and the second windows and in a position that is offset from the displayed first and second windows.

7. The method of claim 6 further comprising:
    displaying a cursor on the second window based on the on the determined position of input on the touch sensitive display; and
    dragging a scroll bar on the display of the second window based on a change in a position of the cursor.

8. The method of claim 6 further comprising:
    displaying a cursor on the display based on the on the determined position of input on the touch sensitive display, and
    adding icons or additional information to the second window based on a change in a position of the cursor.

9. The method of claim 8, wherein the displayed second window covers a portion of the first plurality of words in the first window, and wherein the displayed third window covers a portion of the enlarged second window.

10. The method of claim 6,
wherein detecting selection of the first enlarged word includes:
   determining a first position at which a user removed a finger from the surface of the touch sensitive display; and
   detecting selection of the first enlarged word based on the determined first position.

11. A device comprising:
a touch sensitive screen to display information;
a memory to store a plurality of instructions; and
a processor to execute instructions stored in the memory to:
   display, in a first window and via the touch sensitive screen, a plurality of information;
   determine a position of input on the touch sensitive screen;
   identify a selection from the plurality of information based on the determined position of input;
   display an enlarged interface screen in a second window based on the identified selection,
   wherein the enlarged interface screen is displayed concurrently with the first window displaying the plurality of information, and the second window is offset from the displayed first window;
   determine a position of input on the enlarged interface screen of the second window; and
   display, in a third window different from each of the first and the second windows, in response to the determined position of input on the enlarged interface screen, second enlarged information,
wherein the third window is displayed simultaneously with the first and the second windows.

12. The device of claim 11, wherein the enlarged interface screen displays a plurality of words based on the identified selection.

13. The device of claim 11, wherein the determined position of input is determined by sensing a position of a finger of a user or a stylus.

14. The device of claim 13, wherein the identified selection is based on a position that is identified when a user removes a finger from the surface of the touch sensitive display.

15. A non-transitory computer readable medium, having stored sequences of instructions which, when executed by at least one processor, cause the at least one processor to:
   display in a first window a plurality of information on a display;
   determine a position of input on the display;
   detect based on the determined position of input, selection of first information displayed on the display;
   display, on the display and in a different window, an enlarged window that includes at least some of the first information, and wherein the enlarged window is offset from the displayed first window;
   select a particular information from the first information, based on a second input detected within the enlarged window;
   display a cursor on the display based on the on the determined position of input on the display; and
   add additional information to the second window based on a change in a position of the cursor.

16. The non-transitory computer readable medium of claim 15, wherein the displayed first information includes a plurality of selectable information.

17. The non-transitory computer readable medium of claim 16, wherein the enlarged window displays at least a plurality of words based on the first information.

18. The non-transitory computer readable medium of claim 15, wherein the stored sequences of instructions further cause the at least one processor to:
   determine the second input based on a position of a position of a finger of a user or a within the enlarged window.

19. The non-transitory computer readable medium of claim 18, wherein the determined second input is based on a position of liftoff.

20. The non-transitory computer readable medium of claim 15, wherein the enlarged window covers a portion of the first information.

* * * * *